United States Patent
Wieczorek et al.

(10) Patent No.: US 7,234,752 B2
(45) Date of Patent: Jun. 26, 2007

(54) MOLDED VISOR WITH INTEGRAL VANITY FRAME

(75) Inventors: Joseph P. Wieczorek, Lake Orion, MI (US); Bryan Busha, Grand Blanc, MI (US)

(73) Assignee: Irvin Automotive Products, Inc., Pontiac, MI (US)

( * ) Notice: Subject to any disclaimer, the term of this patent is extended or adjusted under 35 U.S.C. 154(b) by 0 days.

(21) Appl. No.: 11/066,830

(22) Filed: Feb. 25, 2005

(65) Prior Publication Data

US 2006/0192404 A1 Aug. 31, 2006

(51) Int. Cl.
*B60J 3/00* (2006.01)

(52) U.S. Cl. ..................................... 296/97.2
(58) Field of Classification Search ............... 296/97.1, 296/97.2, 97.5
See application file for complete search history.

(56) References Cited

U.S. PATENT DOCUMENTS

| | | | |
|---|---|---|---|
| D57,653 S | 4/1921 | Holsberg | |
| 4,247,850 A | 1/1981 | Marcus | |
| 4,411,467 A * | 10/1983 | Cziptschirsch et al. | 296/97.5 |
| 4,494,789 A * | 1/1985 | Flowerday | 362/492 |
| 4,576,409 A | 3/1986 | Ebert | |
| 4,763,946 A * | 8/1988 | Robbins et al. | 296/97.1 |
| 4,773,699 A | 9/1988 | Cebollero | |
| 4,866,579 A * | 9/1989 | Miller et al. | 362/492 |
| 5,364,153 A * | 11/1994 | Vaxelaire | 296/97.5 |
| 5,365,416 A | 11/1994 | Peterson | |
| 5,720,509 A | 2/1998 | Binish | |
| 5,823,603 A | 10/1998 | Crotty, III | |
| 5,984,398 A | 11/1999 | Crotty, III | |
| 6,033,005 A | 3/2000 | Crotty, III | |
| 6,068,323 A | 5/2000 | Brown et al. | |
| 6,131,985 A | 10/2000 | Twietmeyer et al. | |
| 6,254,168 B1 | 7/2001 | Crotty, III | |
| 6,367,861 B1 | 4/2002 | Crotty, III | |
| 6,557,920 B1 | 5/2003 | Hobson et al. | |
| 6,598,928 B1 | 7/2003 | Drake et al. | |
| 6,612,637 B1 | 9/2003 | Crotty, III | |
| 6,641,197 B1 | 11/2003 | Hobson et al. | |
| 6,817,648 B1 | 11/2004 | Tom et al. | |
| 2005/0183262 A1* | 8/2005 | Schoemann et al. | 29/527.1 |

FOREIGN PATENT DOCUMENTS

| | | | | |
|---|---|---|---|---|
| DE | 4313525 | * | 10/1994 | ................. 296/97.1 |
| GB | 1214327 | * | 12/1970 | ................. 296/97.1 |
| JP | 2004-42681 | * | 2/2004 | |
| WO | WO 94/12361 | * | 6/1994 | ................. 296/97.1 |

OTHER PUBLICATIONS

Bolt Products, Inc. "TINNERMAN S-Clip Fastener", 2 Pages, http://www.boltproducts.com/tinnerman.*

* cited by examiner

*Primary Examiner*—Dennis H. Pedder
(74) *Attorney, Agent, or Firm*—Raggio & Dinnin, P.C.

(57) ABSTRACT

A visor molded with an integral vanity frame. In the preferred embodiment of the invention, the visor body is formed with a Class A grained surface and requires no additional finishing such as upholstery.

18 Claims, 6 Drawing Sheets

MOLDED VISOR WITH INTEGRAL VANITY FRAME

BACKGROUND OF THE INVENTION

The present invention relates to visors and particularly to a molded visor with an integral vanity mirror frame.

Visors are a necessity in automobiles, but over the years automobile visors have provided a convenient location for a number of vehicle accessories, notably vanity mirrors which may be illuminated for use under low ambient light conditions. There have been a multitude of visor designs balancing several major design concerns, function (to block sunlight or glare), cost (materials and manufacture), appearance, and features (additional functionality). As the manufacture of visors has matured, so have the expectations of the consumer. Vanity mirrors in visors and high class appearance have become expected in visors even in lower priced automobiles. To date, visors have been molded in various ways, such as molded in one-piece from a rigid plastic foam and covered as disclosed in U.S. Pat. No. 5,890,792 or by utilizing a clam-shell core construction which is covered by a fabric material as disclosed in U.S. Pat. Nos. 6,033,005 and 5,984,398, or integrally molded with an outer covering as disclosed in U.S. Pat. Nos. 5,295,725 and 5,720,509. Typically, the upholstery is selected to match other upholstered portions of the trim package for the automobile, adding material cost and manufacturing and assembly cost. Accessories which are attached to visors typically are mounted within a recess formed in the visor core as, for example, disclosed in the above '725 patent utilizing snap-in fasteners, adhesives or conventional fastening screws. Such mounting methods require additional fasteners and manufacturing steps to accomplish. The '797 and '509 patents disclose visors molded around an accessory (such as a vanity or a garage door opener) which are placed in the mold before plastic injection.

SUMMARY OF THE INVENTION

The visor of the present invention overcomes the difficulties of the prior art by providing a visor in which the vanity frame is integrally molded into the visor and the visor is provided with a Class A finish so no upholstery is necessary.

Although the invention is particularly applicable to a vehicle visor with a vanity mirror frame, other visor accessories could be similarly incorporated and other vehicle components likewise could be manufactured to integrally include such accessories.

These and other features, objects and advantages of the present invention will become apparent upon reading the following description thereof together with reference to the accompanying drawings.

DETAILED DESCRIPTION OF PREFERRED EMBODIMENTS

Figure 1:
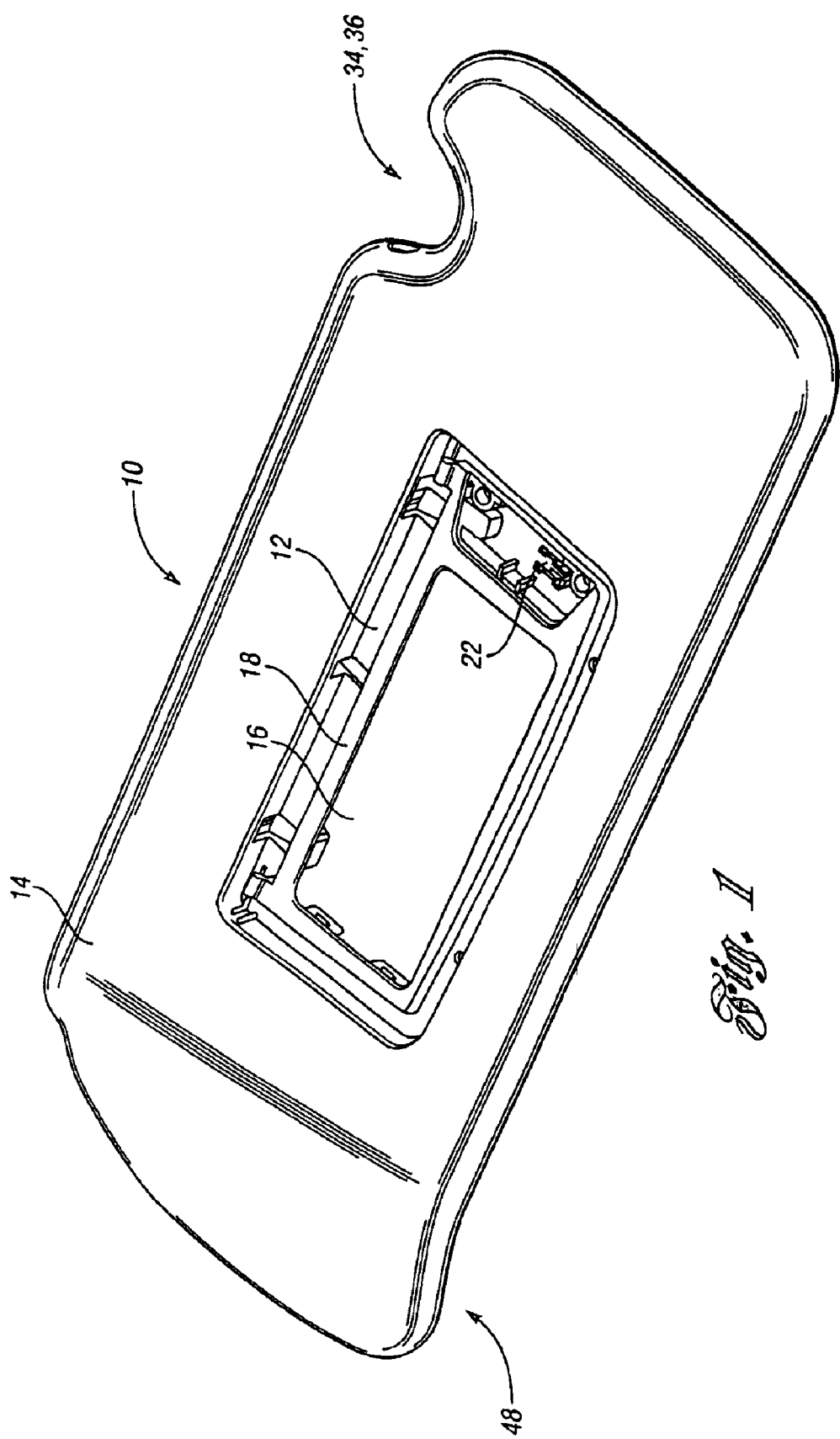
FIG. 1 is a perspective view of a visor according to the present invention.
Figure 2:
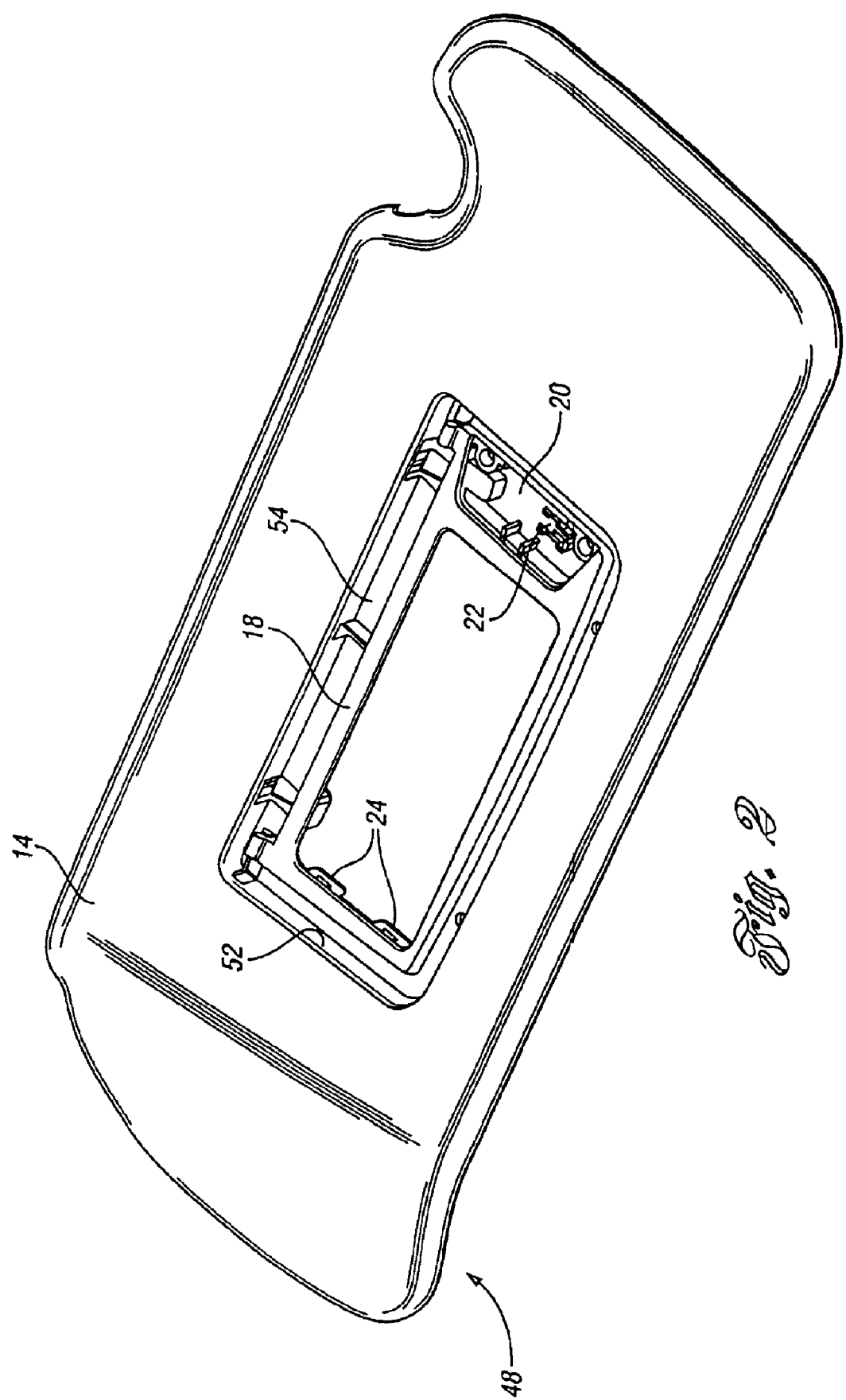
FIG. 2 is a perspective view of the outer portion of the upper shell of the visor shown in FIG. 1 according to the present invention.
Figure 3:
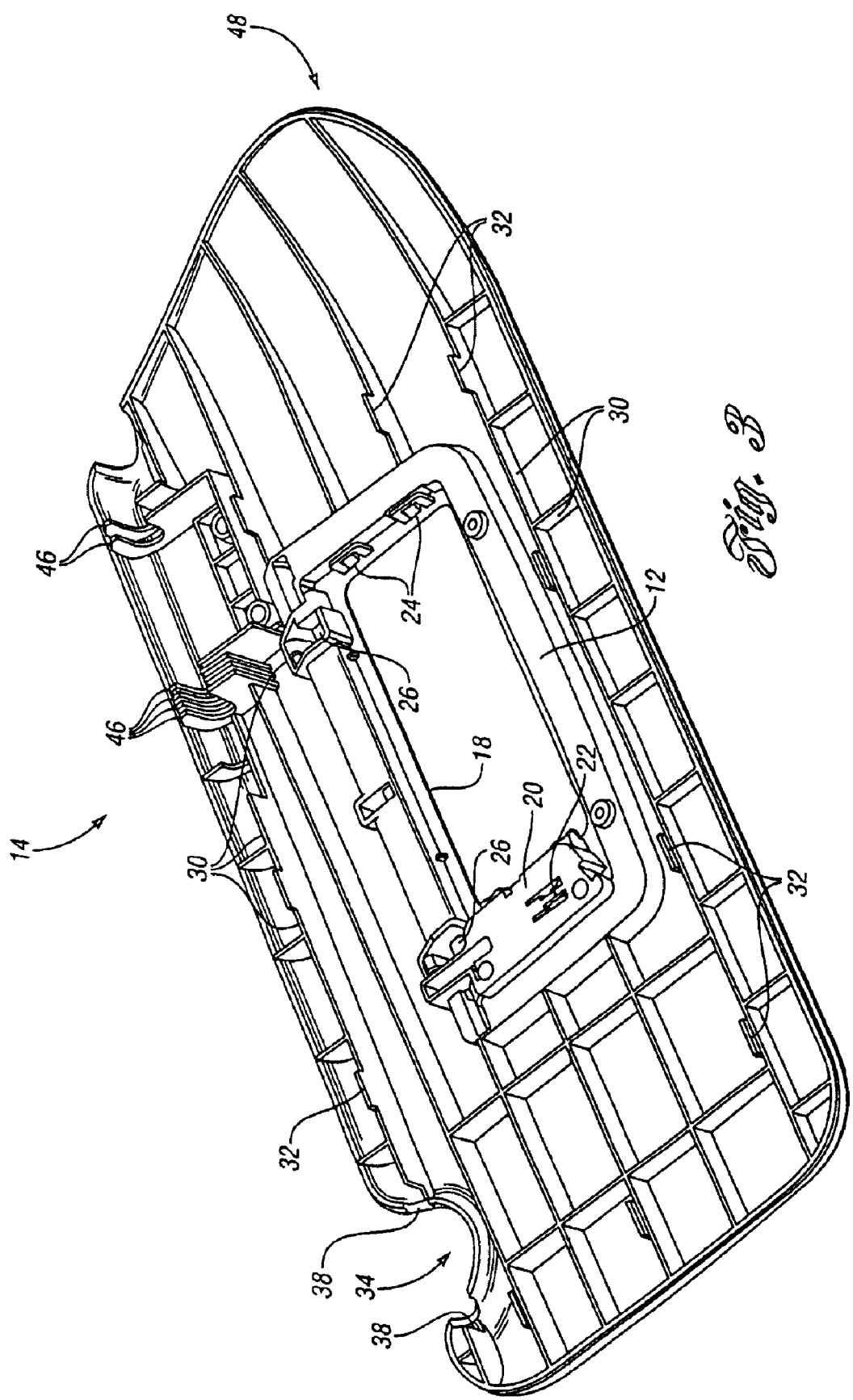
FIG. 3 is a perspective view of the inner portion of the upper shell of the visor shown in FIG. 1 according to the present invention.
Figure 4:
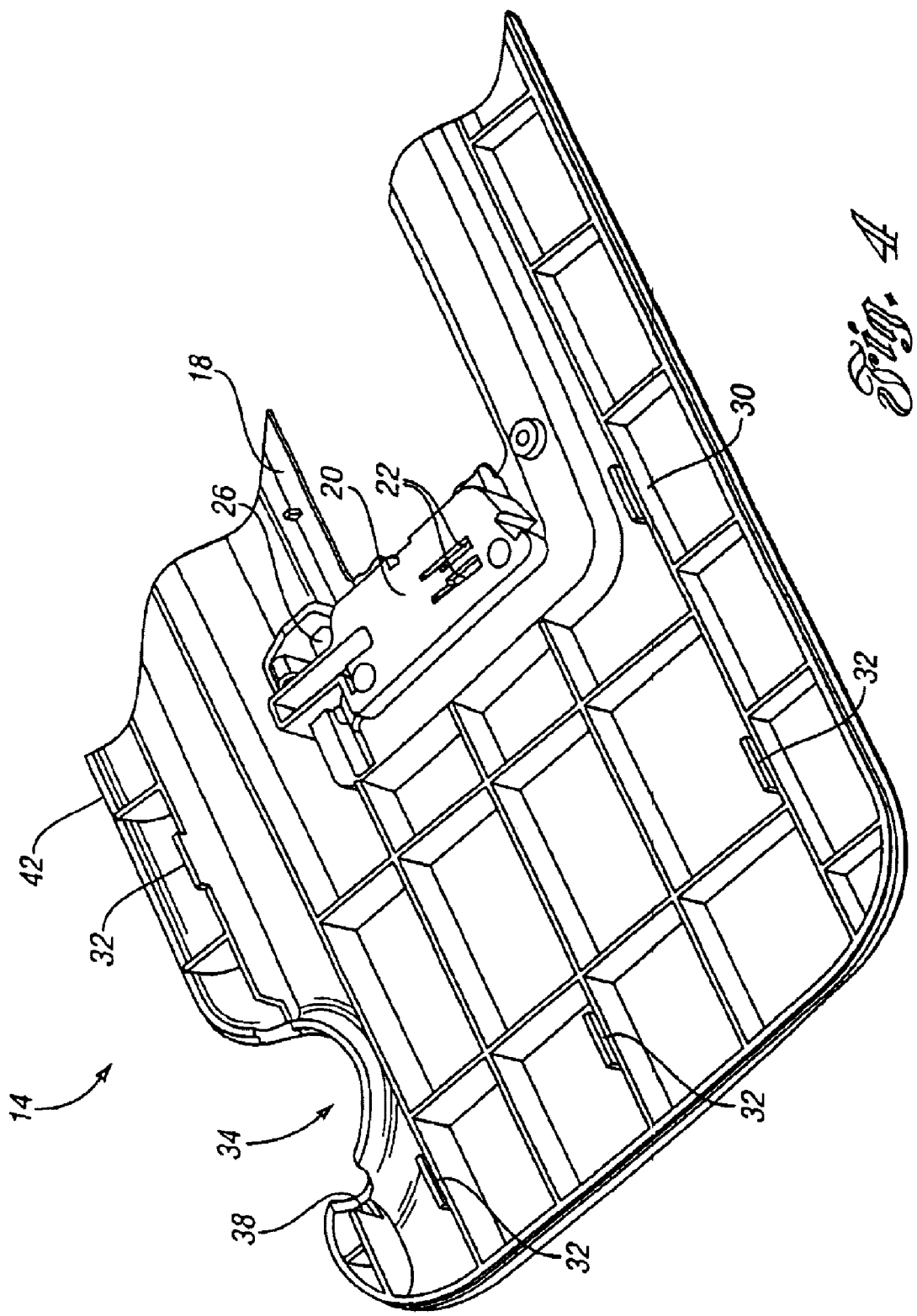
FIG. 4 is an enlarged perspective view of the inner portion of the upper shell of the visor shown in FIG. 1 according to the present invention.

Referring to FIG. 1 there is shown a molded visor 10. The visor 10 is formed from two mating molded shells, upper shell 14 and lower shell 16. The upper shell 14, shown in FIGS. 2-4, is formed with an integrally molded vanity mirror frame 12.

Although the specific vanity may vary in accordance with each automobile model, the vanity frame 12 is generally recessed and includes a light housing 20 for receiving a light bulb assembly (not shown) such as disclosed in U.S. Pat. No. 4,721,310, incorporated herein by reference. Within the light housing 20 are one or more wiring apertures 22 for receiving the wiring to supply power to the light or for other accessories. The light housing 20 may also include a switch means for activating the light) whether manually or automatically upon opening the vanity door (not shown). The vanity frame 12 recessed housing has inwardly extending side walls 52 and a lateral rear housing surface 54.

The vanity frame 12 also includes mirror brackets 24 beneath the raised mirror trim ring 18 for receiving and holding a mirror (not shown) having corresponding tabs or tangs. As shown in FIG. 3, the raised trim ring 18 forms a recess on the interior of the upper shell 14 for receiving the mirror. The outer surface of the trim ring 18 seen in FIG. 2, allows a vanity door (not shown) to be closed against the trim ring surface without impacting the mirror, which may be important as such vanity doors are typically provided with a biasing force to close the vanity door from any position except the full open position.

The top edge of the mirror frame 12 further includes apertures 26 for receiving the hinge means for attaching the vanity door (not shown) such as described in the '310 patent.

Figure 5:
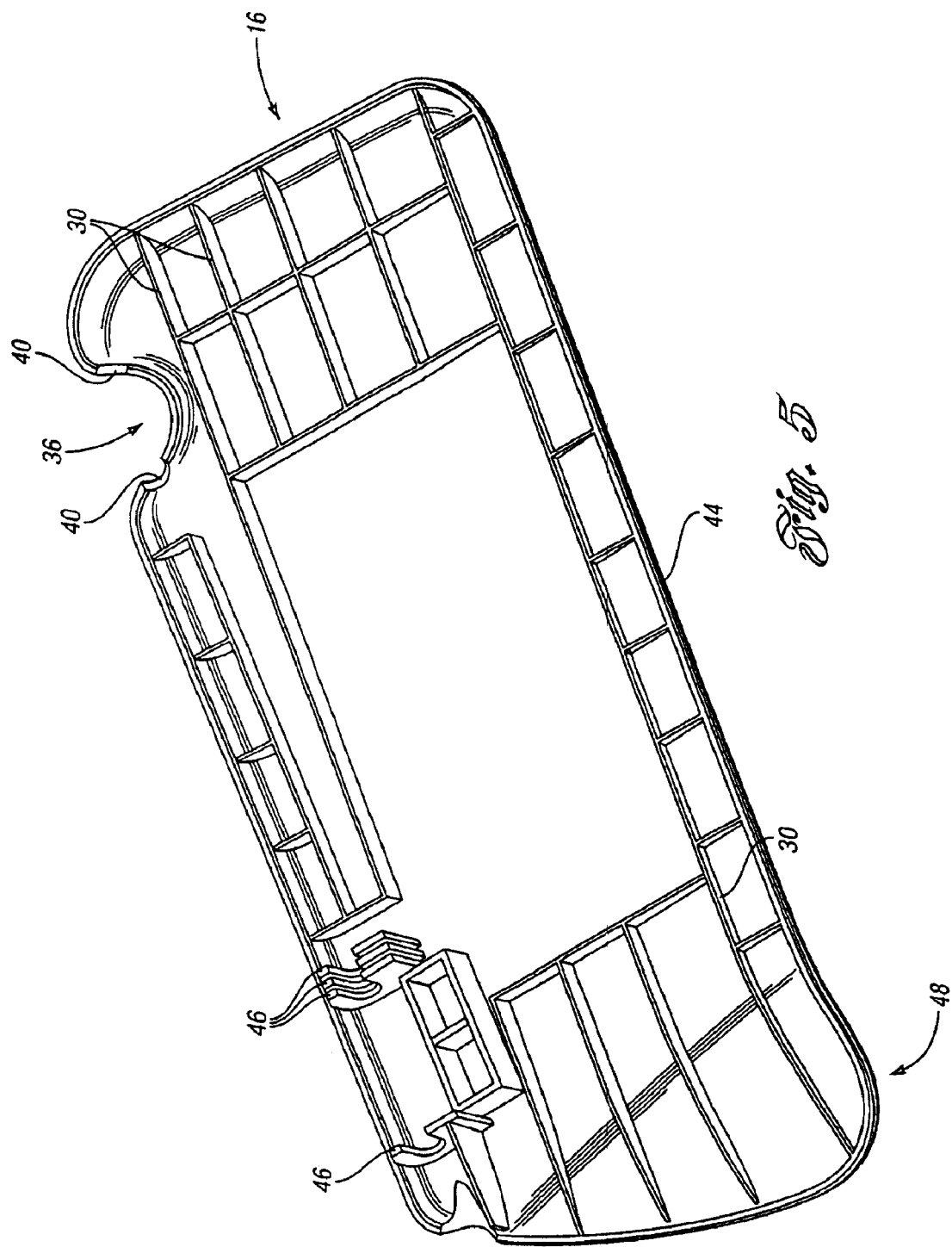
FIG. 5 is a perspective view of the inner portion of the lower shell of the visor shown in FIG. 1 according to the present invention.
Figure 6A:
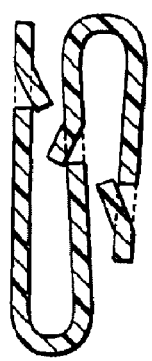
FIG. 6A is an end view of a fastener for fastening the upper and lower shells.
Figure 6B:
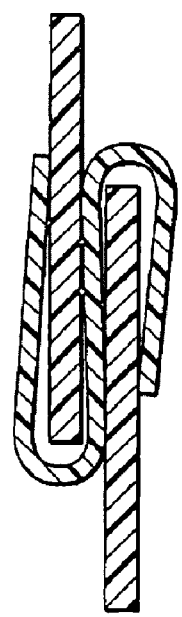
FIG. 6B is a cross section view of the fastener of FIG. 6A fastening the upper and lower shells.
Figure 6C:
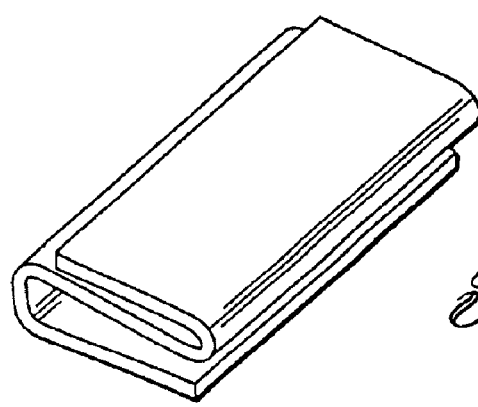
FIG. 6C is a perspective view of the fastener of 6A.

Referring to FIGS. 3 and 5, the upper and lower shells are provided with mating reinforcement ribs 30 to enhance stiffness and to provide additional structural strength to the visor. Perimeter ribs 30 have fastening tabs 32 for receiving fasteners such as Tinnerman S-Clip fasteners with retaining barbs (FIG. 6A) to hold the shells together when assembled. The tabs 32 preferably extend past the ribs 30 of the opposing shell when assembled, as illustrated in FIG. 6B. Alternatively, the ribs 30 of one of either the upper or lower shells may be provided with recessed tabs, areas of recessed thickness corresponding to the shape of an arm of the fastener as shown in FIG. 6C.

The upper and lower shells have retainer pin recesses 34 and 38 and arcuate pin receivers 38 and 40 formed in the respective lips 42 and 44 so that a retainer pin (not shown) may be "snap fit" into place and retained in place when the shells are assembled.

The upper and lower shells further have a plurality of arcuate ribs 46 forming a generally cylindrical recess when the shells are assembled. The ribs 46 may be arranged to receive a slide control unit or torque titling for the visor support/pivot arm (not shown) such as disclosed in U.S. Pat. No. 5,890,792, incorporated herein by reference.

The shells are preferably formed by injection molding utilizing plastic such as ABS or polypropylene. It is further preferred that each mold cavity surface be etched to provide a grained pattern on the exterior surfaces of the shells. These exterior surfaces may be molded with a Class A surface to provide a finished part when assembled without upholstery. The plastic may be colored as desired to match or compliment interior trim as desired by the customer. Further, the molds may be designed to provide any shape or size visor desired by the customer, including features such a curved ear 48 to better conform to the headliner near the point of attachment to the headliner.

These and other modifications to the preferred embodiment of the invention as described herein can be made by those skilled in the art that without departing from the spirit or scope of the invention as defined by the appended claims. Other aspects, features and advantages will be apparent upon an examination of the attached drawing figures and appended claims.

What is claimed is:

1. A vehicle visor molded of a polymeric material having a vanity frame integrally molded therein, said frame comprising:
    a recessed housing having inwardly extending side walls and lateral rear housing surface;
    at least one aperture in said frame for receiving a hinge means of a vanity door;
    a trim ring laterally outward of said rear housing surface;
    mirror receiving brackets on said vanity frame inward of said trim ring; and
    a second recessed housing for receiving a lighting assembly.

2. The visor as defined in claim 1 wherein said vanity frame further comprising a wire aperture arranged in said second recessed housing.

3. The vehicle visor of claim 1 further comprising:
    two generally planar shells combined to form the visor body, each of said shells having at least one inwardly extending rigid rib portion substantially aligning with and overlapping a rib extending from the other of said shells, and
    at least one S-clip fastener having retaining barbs fixed to a pair of said overlapping ribs, fastening said shells.

4. The visor of claim 3 further comprising at least one recess on one of said ribs for locating one of said S-clip fastener.

5. A vehicle visor molded of a polymeric material comprising:
    two generally planar shells combined to form the visor body, each of said shells having at least one inwardly extending rigid rib substantially aligning with and overlapping a rib extending from the other of said shells, each of said shells having a finished exterior surface without upholstery; and
    at least one S-clip fastener having a retaining barb fixed to a pair of overlapping ribs, fastening said shells.

6. The visor of claim 5 further comprising at least one recess on one of said ribs for locating one of said S-clip fastener and said finished exterior surface being a class A surface.

7. The vehicle visor of claim 5 further comprising an integrally molded vanity frame, and
    a recessed housing having inwardly extending side walls and lateral rear housing surface.

8. The vehicle visor of claim 6 further comprising an integrally molded vanity frame and;
    a recessed housing having inwardly extending side walls and lateral rear housing surface.

9. The visor as defined in claim 8 further comprising a trim ring laterally outward of said rear housing surface.

10. The visor as defined in claim 9 further comprising mirror receiving brackets on said vanity frame inward of said trim ring.

11. The visor as defined in claim 7 wherein said vanity frame further comprises a second recessed housing for receiving a lighting assembly.

12. A vehicle visor, said visor comprising:
    an upper shell molded of a polymeric material;
    a lower shell molded of a polymeric material, said upper shell and said lower shell having reinforcement ribs on a perimeter thereof, said upper shell having fastening tabs; and
    a recessed vanity frame integrally molded within said upper shell, said vanity frame includes an integrally molded trim ring and integrally molded mirror brackets extending from a surface of said trim ring, said vanity frame including a recessed light housing having at least one wiring aperture therein.

13. The visor of claim 12 wherein said upper shell is molded with an exterior surface that has a finished surface without upholstery.

14. The visor of claim 12 wherein said lower shell is molded with an exterior surface that has a finished surface without upholstery.

15. The visor of claim 13 further comprising apertures arranged in said vanity frame.

16. The visor of claim 13 wherein said polymeric material is injection molded.

17. The visor of claim 12 further comprising S-clips received by said fastening tabs to secure said upper shell to said lower shell.

18. The visor of claim 12 wherein said upper and lower shells each comprising a retainer pin recess and arcuate pin receiver molded in a lip of each of said shells.

* * * * *